(12) United States Patent
Enomoto et al.

(10) Patent No.: US 6,227,432 B1
(45) Date of Patent: May 8, 2001

(54) FRICTION AGITATION JOINTING METHOD OF METAL WORKPIECES

(75) Inventors: Masatoshi Enomoto; Seiji Tasaki; Naoki Nishikawa; Takenori Hashimoto, all of Tochigi (JP)

(73) Assignee: Showa Aluminum Corporation, Osaka (JP)

( * ) Notice: Subject to any disclaimer, the term of this patent is extended or adjusted under 35 U.S.C. 154(b) by 0 days.

(21) Appl. No.: 09/252,297

(22) Filed: Feb. 18, 1999

(51) Int. Cl.[7] .................... B23K 20/12; B23K 20/22
(52) U.S. Cl. ...................... 228/112.1; 228/114.5
(58) Field of Search .................. 228/112.1, 114, 228/114.5, 113, 135, 136, 193, 195, 2.1, 2.3

(56) References Cited

U.S. PATENT DOCUMENTS

| | | | |
|---|---|---|---|
| 3,693,238 | * 9/1972 | Hoch et al. | 29/470.3 |
| 3,831,262 | * 8/1974 | Luc | 29/470.1 |
| 5,111,990 | * 5/1992 | Thrower et al. | 228/113 |
| 5,165,589 | * 11/1992 | Nied et al. | 228/102 |
| 5,348,210 | * 9/1994 | Linzell | 228/115 |
| 5,460,317 | * 10/1995 | Thomas et al. | 228/112.1 |
| 5,713,507 | * 2/1998 | Holt et al. | 228/112.1 |
| 5,718,366 | * 2/1998 | Colligan | 228/106 |
| 5,794,835 | * 8/1998 | Colligan et al. | 228/2.1 |
| 5,829,664 | * 11/1998 | Spinella et al. | 228/112.1 |

FOREIGN PATENT DOCUMENTS

| | | |
|---|---|---|
| 44 09 769 | 9/1995 | (DE) . |
| 196 35 766 | 5/1998 | (DE) . |

WO 98/04381   7/1996 (WO) .

OTHER PUBLICATIONS

Metals Handbook: Vol. 6. Nippes. 1983. pp. 719–725.*
Japanese Unexamined Laid–Open Patent Publication No. 10–137952 published on May 26, 1998 and the English abstract.
Japanese Unexamined Laid–Open Patent Publication No. 8–281451 published on Oct 29, 1996.
Japanese Unexamined Laid–Open Patent Publication No. 7–214361 published on Aug. 15, 1995 and the English abstract.
Japanese Unexamined Laid–Open Patent Publication No. 50–160148 published on Dec. 25, 1975.
Japanese Patent Publication No. 7–505090.
Japanese Unexamined Laid–Open Patent Publication No. 62–21480 published on Jan. 29, 1987 and the English abstract.
Japanese Unexamined Laid–Open Patent Publication No. 10–137951 published on May 26, 1998 and the English abstract.
Japanese Unexamined Laid–Open Patent Publication No. 1–284492 published on Nov. 15, 1989 and the English abstract.

*Primary Examiner*—Patrick Ryan
*Assistant Examiner*—Jonathan Johnson

(57) ABSTRACT

A friction agitation jointing method of workpieces for subjecting the workpieces made of metals having deformation resistance or melting points different from each other to friction agitation jointing in which two of the workpieces are subjected to the friction agitation jointing while forming a peak of friction agitation force or temperature on a side of the workpiece having a larger or a higher one of the deformation resistance or the melting points relative to a bond interface between the two workpieces.

8 Claims, 8 Drawing Sheets

OTHER PUBLICATIONS

Japanese Unexamined Laid–Open Patent Publication No. 8–174249 published on Jul. 9, 1996 and the English abstract.

Japanese Unexamined Laid–Open Patent Publication No. 6–238474 published on Aug. 30, 1994 and the English abstract.

Japanese Unexamined Laid–Open Utility Model Publication No. 54–171639 published on Dec. 4, 1979.

Japanese Unexamined Laid–Open Patent Publication No. 8–229681 published on Sep. 10, 1996 and the English abstract.

Japanese Unexamined Laid–Open Patent Publication No. 7–276073 published on Oct. 24, 1995 and the English abstract.

Japanese Unexamined Laid–Open Utility Model Publication No. 5–88784 published on Dec. 3, 1993.

Japanese Unexamined Laid–Open Utility Model Publication No. 61–41470 published on Mar. 17, 1986.

PCT International Patent Publication No. WO 93/10935.

"Bonding of Aluminum Alloys by Plastic Flow," Masacoshi Enomoto et al., pp. 495–496, Collected Papers for Lectures of the 47th Plaastic Working Association Lecture Meeting, the Japan Plastic Working Society and other 8 Societies, Accepted by the National Diet Library on Oct. 18, 1996.

* cited by examiner-

FRICTION AGITATION JOINTING METHOD OF METAL WORKPIECES

BACKGROUND OF THE INVENTION

1. Field of the invention

The present invention relates to a friction agitation jointing method of metal workpieces used in various fields of transportation apparatus and heavy and light electric machines.

2. Description of the Related Art

In recent times, a jointing method referred to as friction agitation jointing method has been reduced into practice. According to the friction agitation jointing method, workpieces are jointed together by solid phase bonding in which a rotor (1) as shown by FIG. 8 is used as a tool. According to the rotor (1), a front end axial core portion of a cylindrical rotor main body (2) is coaxially and integrally projected with a friction agitation probe (3) in a pin-like shape having a diameter smaller than that of the cylindrical rotor main body (2) and the rotor (1) is fabricated by a material such as steel which is hard and excellent in heat resistance. Further, although illustration is omitted, recesses and protrusions for agitation are formed on the surface of the probe (3).

In jointing operation, while the rotor (1) is being rotated around its own axis, the front end of the probe (3) is brought into contact with an abutment boundary portion (53) between workpieces (51) and (52) in a pressed state and the contact portion is softened and plasticized by the frictional heat. Further, the rotor (1) is pressed further to the workpieces (51) and (52), the probe (3) is embedded in the wall thickness direction of the workpieces (51) and (52) and a shoulder portion (4) at the front end of the cylindrical rotor main body (2) is brought into contact with the workpieces (51) and (52) in a pressed state. Thereafter, while maintaining the state, the rotor (1) is moved along the abutment boundary portion (53) between the workpieces (51) and (52). At the abutment boundary portion where the rotor (1) passes, the surrounding material is softened and agitated by the frictional heat caused by rotation of the rotor (1), further, after the material has been plastically flowed to embed a groove produced by passing the probe (3) while scattering of the material is being restricted by the shoulder (4) of the cylindrical rotor main body (2), the material loses rapidly the heat and cooled and solidified. In this way, softening, adhesion, deformation, agitation, cooling and solidification of the material at the abutment portion (53) are successively repeated in accordance with movement of the rotor (1) and the workpieces (51) and (52) are integrated together at the abutment portion (53) and are successively jointed (58).

The friction agitation jointing method is considerably expected to achieve power in jointing metal workpieces in view of a point that the workpieces (51) and (52) are jointed together in a softened state without melting the material and the joint portion is difficult to undergo metallurgical effect caused by a heat affected zone as in welding.

However, according to the friction agitation jointing method, there poses the following problem when metal workpieces having different deformation resistance and metal workpieces having different melting points are jointed.

That is, in the case of jointing together the metal workpieces having different deformation resistance, when jointing operation is carried out by exerting an abutment portion with an agitation force necessary for sufficiently plastically flowing a workpiece having larger deformation resistance, plastic flow of the workpieces having the larger deformation resistance becomes dominant at the abutment portion and there is caused a drawback in which a uniform agitation jointing state of members for use cannot be achieved. Meanwhile, when jointing operation is carried out by exerting small agitation force to the abutment portions, although a workpiece having smaller deformation resistance is plastically flowed, the plastic flow of a workpiece having larger deformation resistance becomes insufficient and there causes a drawback in which excellent jointing state cannot also be achieved.

Meanwhile, in the case of jointing together metal workpieces having different melting points, when jointing operation is carried out by elevating temperature of the joint portion to softening temperature of a workpiece having higher melting point, melting is caused in a workpiece having lower melting point at the temperature and solid phase bonding is not established and there causes a drawback in which a metallurgical effect caused by a heat affected zone of the joint portion is resulted. Meanwhile, when jointing operation is carried out by elevating temperature of the joint portion to softening temperature of a workpiece having lower melting point, softening of a workpiece having higher melting point becomes insufficient, agitation of materials is not carried out excellently and there causes a drawback in which firm bonding cannot be achieved.

SUMMARY OF THE INVENTION

It is a first object of the invention to provide a friction agitation jointing method capable of firmly jointing together workpieces made of metals having different deformation resistance with excellent quality.

It is a second object of the invention to provide a friction agitation jointing method capable of firmly jointing together workpieces made of metals having different melting points with excellent quality.

The above-described object is resolved by a friction agitation jointing method of workpieces made of metals for subjecting the workpieces made of the metals having deformation resistance different from each other to friction agitation jointing wherein the two workpieces are brought into the friction agitation jointing while forming a peak of a friction agitation force on a side of one of the workpieces having a larger one of the deformation resistance relative to a bond interface between the two workpieces.

That is, on a premise that according to friction agitation jointing, two workpieces are jointed together in a solid phase without causing a molten state at a bond interface between the two workpieces, the two workpieces are subjected to the friction agitation jointing while forming the peak of the friction agitation force on the side of the workpiece having the larger deformation resistance relative to the bond interface of the two workpieces by which sufficient plastic flow is ensured in respect of the workpiece having the larger deformation resistance. Although the friction agitation force is reduced in accordance with reaching the bond interface, a value of the peak of the friction agitation force is set such that the friction agitation force for causing sufficient plastic flow also in respect of the workpiece having the smaller deformation resistance is ensured. Thereby, materials of the two workpieces are uniformly agitated at the bond interface between the two workpieces, the two materials are uniformly mixed together and the workpieces made of the metals having different deformation resistance are jointed with excellent quality and firmly.

Further, when the workpieces made of the metals having different deformation resistance are brought into an abutted state and the two workpieces are subjected to the friction agitation jointing, a rotating probe is arranged in a state in which the rotating probe is displaced to and embedded in the side of the workpiece having larger deformation resistance in respect of an abutted portion and the workpieces are subjected to the friction agitation jointing while moving at least the probe or the workpieces under the state by which the workpieces can excellent be jointed together while forming the peak of the friction agitation force on the side of the workpiece having larger deformation resistance.

Further, when the workpieces made of the metals having different deformation resistance are brought into an overlapped state and the two workpieces are subjected to the friction agitation jointing, a rotating probe is arranged in a state in which the rotating probe is embedded in an overlapped portion from the side of the workpiece having larger deformation resistance and the workpieces are subjected to friction agitation bonding while moving at least the probe or the workpieces under the state by which the two workpieces can excellently be jointed together while forming the peak of the friction agitation force on the side of the workpiece having higher deformation resistance relative to the bond interface of the two workpieces.

Further, the above-described object can also be achieved by a friction agitation jointing method of workpieces made of metals which is a friction agitation jointing method of workpieces made of metals different from each other for subjecting the workpieces made of the metals having melting points different from each other to friction agitation jointing wherein two of the workpieces are subjected to the friction agitation jointing while forming a peak of a temperature on a side of one of the workpiece having a higher one of the melting points relative to a position of portions of the two workpieces at which the two workpieces are brought into contact with each other.

That is, on the premise that according to the friction agitation jointing, the two workpieces are jointed together in a solid phase without causing a melted state at portions of the two workpieces which are bought into contact with each other, the two workpieces are bought into friction agitation jointing while forming the peak of the temperature on the side of the workpiece having a higher melting point relative to the position of the portions of the two workpieces which are brought into contact with each other by which the workpiece having the high melting point is softened with a higher degree over a wide range and materials of the two workpieces are excellently agitated by operation of the jointing tool. Accordingly, the workpieces made of the metals having different melting points are jointed together with excellent quality and firmly.

In this case, an ideal solid phase joint portion is obtained by subjecting the two workpieces to the friction agitation jointing while controlling a temperature of the portions of the two workpieces which are brought into contact with each other at a temperature equal to or higher than the recrystallization temperature of the workpiece having the low melting point and less than the melting temperature of the workpiece having the lower melting point.

Further, when the workpieces made of the metals having different melting points are brought into an abutted state, a rotating probe is arranged in a state in which the rotating probe is displaced to and embedded in the side of the workpiece having the high melting point relative to an abutted portion and the workpiece is subjected to the friction agitation jointing while moving at least the probe or the workpieces under the state, formation of the temperature peak mentioned above can easily be realized.

Further, also when the workpieces made of the metals having different melting points are arranged in an overlapped state, a rotating probe is arranged in a state in which the rotating probe is embedded in an overlapped portion from the side of the workpiece having higher melting point and the workpieces are subjected to the friction agitation jointing while moving at least the probe or the workpieces under the state, formation of the temperature peak mentioned above can easily be realized.

Otherwise, formation of the temperature peak can be realized also by separately heating and/or cooling the workpieces. Particularly, in the case in which formation of the temperature peak is difficult only by way of operating the jointing tool due to the thermal conductivity of the workpiece, this method is an extremely effective method.

Other objects, features and advantages of the invention will be understood further excellently by the following description in reference to attached drawings.

BRIEF DESCRIPTION OF THE DRAWINGS

FIGS. 3A and 3B show a third embodiment in which FIG. 3A is a sectional view of workpieces in jointing and FIG. 3B is a graph showing a temperature profile thereof;

FIGS. 4A and 4B show a case in which a method of the third embodiment is applied to a fourth embodiment as it is in which FIG. 4A is a sectional view of workpieces in jointing and FIG. 4B is a graph showing a temperature profile thereof;

FIGS. 6A and 6B show a fifth embodiment in which FIG. 6A is a sectional view of workpieces in jointing and FIG. 6B is a graph showing a temperature profile thereof;

FIGS. 7A and 7B show a comparative example in contrast to the third embodiment in which FIG. 7A is a sectional view of workpieces in jointing and FIG. 7B is a graph showing a temperature profile thereof.

DESCRIPTION OF THE PREFERRED EMBODIMENTS

According to a first embodiment, as metal workpieces having different deformation resistance, a workpiece made of pure aluminum of JIS (Japanese Industrial Standards) 1100 (hereinafter, referred to as pure Al series workpiece) and a workpiece made of JIS 5083 aluminum alloy which is an Al—Mg series alloy (hereinafter, referred to as Al—Mg series workpiece) are brought into an abutted state and subjected to friction agitation jointing. The deformation resistance of the pure aluminum series workpiece is 4 kg/mm$^2$ and that of Al—Mg series is 16 kg/mm$^2$.

Figure 1:
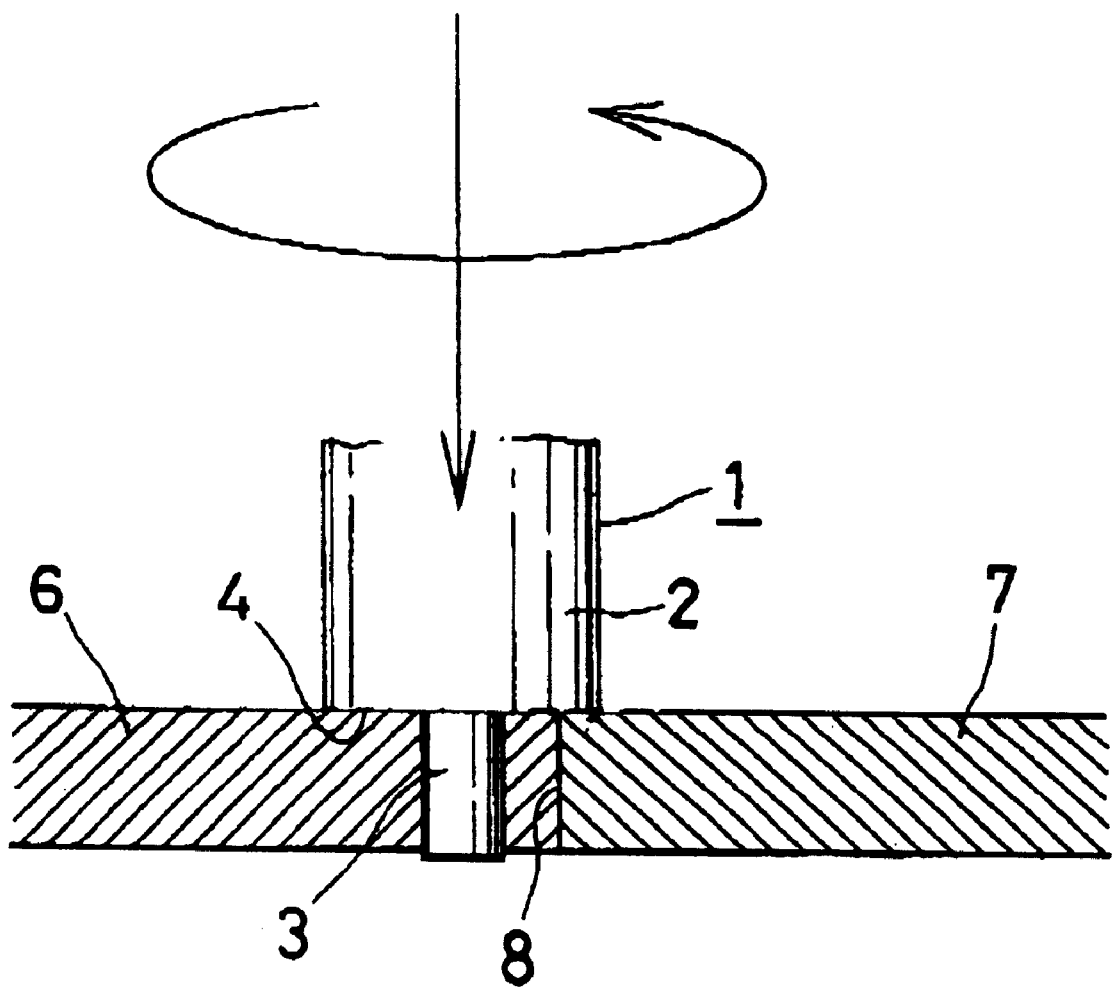
FIG. 1 is a sectional view showing a first embodiment when two workpieces are abutted and jointed.

As shown by FIG. 1, an Al—Mg series workpiece (6) and a pure aluminum series workpiece (7) are brought into an abutted state and the rotor (1) which is a jointing tool is operated to displace from an abutment portion (bond interface) (8) between the two workpieces (6) and (7) to the side of the Al—Mg series workpiece (6) having higher deformation resistance to thereby carry out friction agitation jointing. Thereby, in the friction agitation jointing operation, a peak of friction agitation force is formed to dispose on the side of the Al—Mg series workpiece (6) relative to the abutment portion between the two workpieces (6) and (7). The friction agitation force becomes smaller as being adjacent to the abutment face. Further, by selecting rotational speed of the rotor (1) or an interval distance between a position of the abutment portion (8) between the workpieces (6) and (7) and a rotational center of the rotor (1), the friction agitation force at the abutment portion (8) between the two workpieces (6) and (7) is set to be larger than a value necessary for plastic flow of the pure aluminum series workpiece (7) which is a workpiece having smaller deformation resistance.

By carrying out the friction agitation jointing in this way, the Al—Mg series workpiece (6) having larger deformation resistance is exerted with the friction agitation force larger than that exerting on the abutment portion (8) and accordingly, an agitation region is formed over a wide range and sufficient plastic flow is produced. Further, the bond interface between the two workpieces is exerted with friction agitation force pertinent for the two workpieces, the two workpieces are uniformly mixed and there is achieved a firm solid phase bond portion which is excellent in quality with no adverse metallurgical effect. From the start, temperature in jointing is less than the melting point and accordingly, no thermal effect is resulted as in the case of molten welding.

Figure 2:
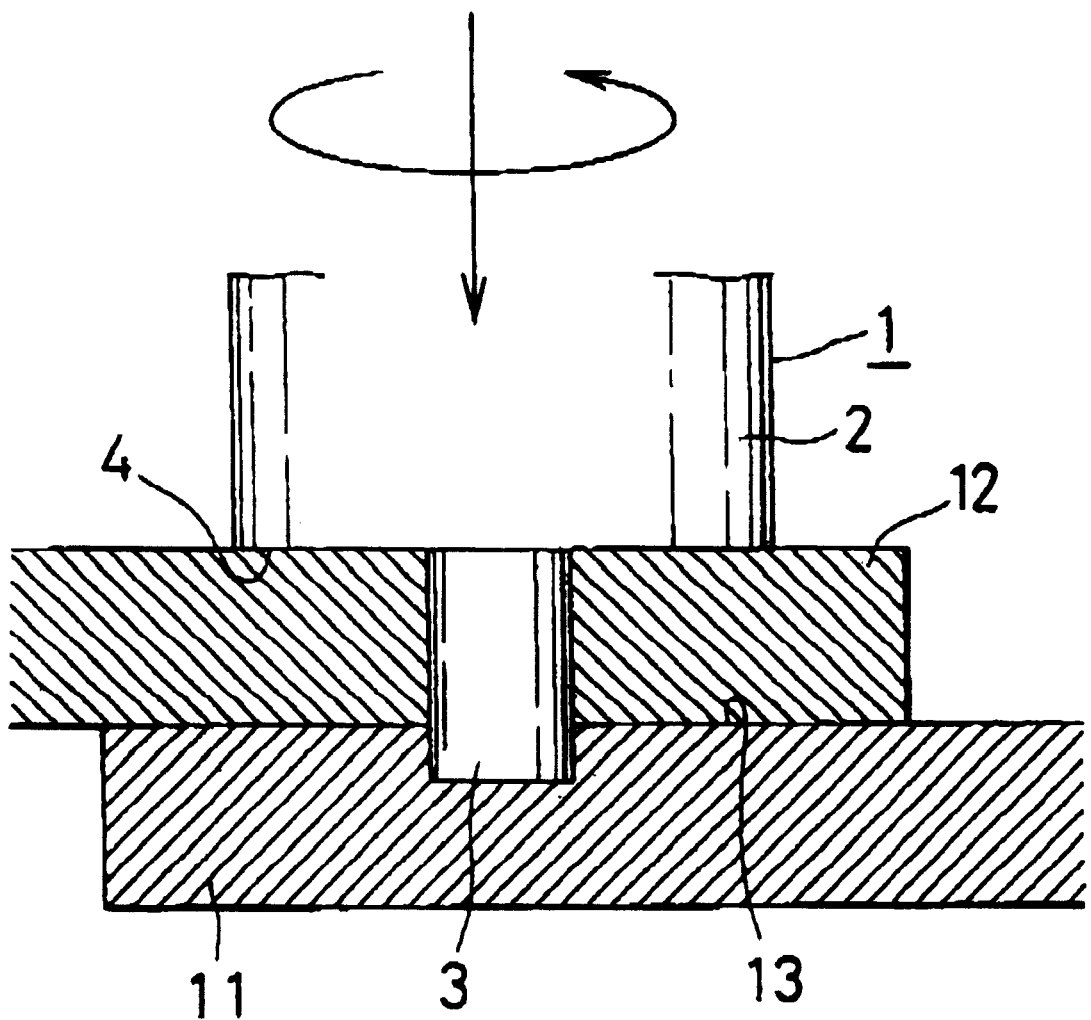
FIG. 2 is a sectional view showing a second embodiment when two workpieces are overlapped and jointed.

FIG. 2 shows a second embodiment of the invention. According to the embodiment, a metal workpiece (11) having smaller deformation resistance and a metal workpiece (12) having larger deformation resistance are brought into an overlapped state and subjected to friction agitation jointing. In this case, as shown by the drawing, jointing is carried out by operating the rotor (1) from the side of the workpiece (12) having larger deformation resistance to reach the wall of an overlapped portion between the two workpieces (11) and (12). According to the friction jointing operation, a peak of the friction agitation force is formed on the side of the workpiece (12) into which the probe (3) is embedded in a wall thickness penetrating state. Further, the friction agitation force at an overlapped portion (13) (bond interface) between the two workpieces (11) and (12) is set to be larger than a value necessary for causing plastic flow in the workpiece (12) having larger deformation resistance by selecting the rotational speed of the rotor (11) or a shape of the probe (3) of the rotor (1).

By carrying out the friction agitation jointing in this way, the Al—Mg series workpiece (6) having larger deformation resistance is exerted with the friction agitation force larger than that exerted on the overlapped portion (13) and accordingly, an agitation region is formed over a wide range and sufficient plastic flow is caused. Further, the bond interface between the two workpieces is exerted with friction agitation force pertinent for the two workpieces, the two workpieces are mixed together uniformly and there is achieved a firm solid phase bond portion which is excellent in quality with no adverse metallurgical effect.

FIG. 3 shows a third embodiment of the invention. According to the third embodiment, a workpiece made of copper and a workpiece made of aluminum are brought into an abutted state and subjected to friction agitation jointing. The melting point of copper is 1083° C. and that of aluminum is 660° C. Further, thermal conductivity of the copper workpiece is higher than that of the aluminum workpiece.

Figure 3A:
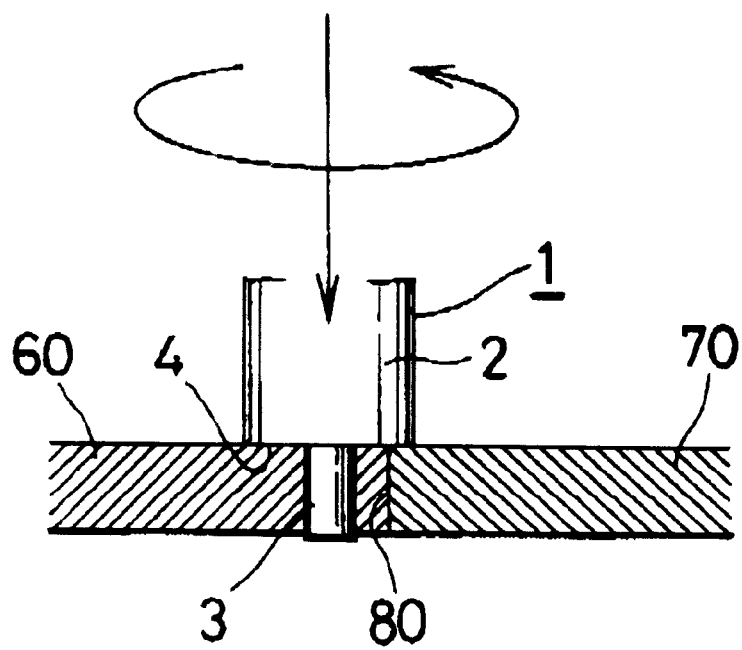
Figure 3B:
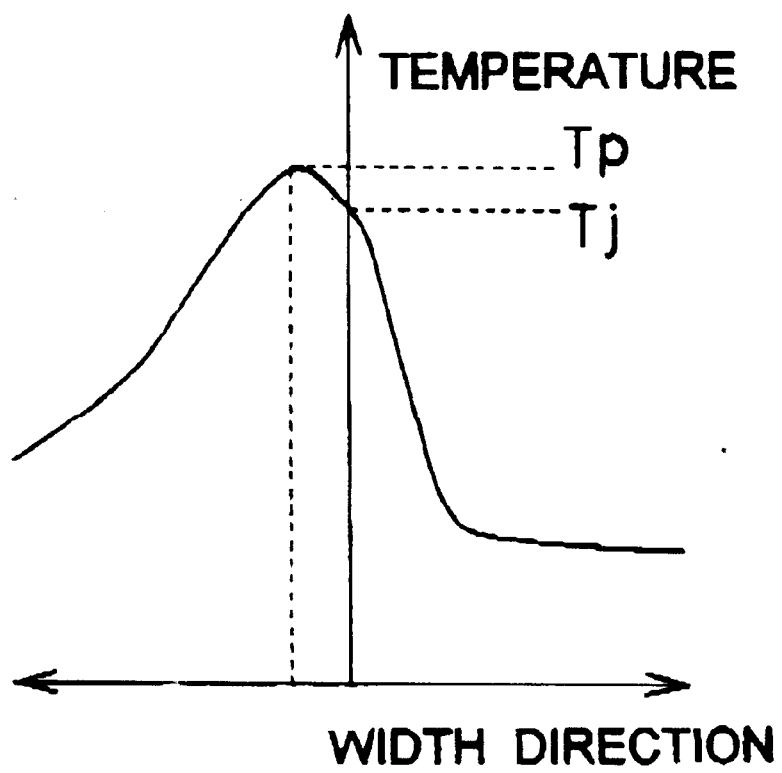

As shown by FIG. 3A, the copper workpiece (60) and the aluminum workpiece (70) are brought into an abutted state and friction agitation jointing is carried out by operating to deviate the rotor (1) which is a jointing tool to the side of the copper workpiece (60) which is a high melting point workpiece relative to a position of an abutment portion between the two workpieces (60) and (70). Thereby, as shown by FIG. 3B, temperature peak Tp is formed to dispose on the side of the copper workpiece (60) relative to the position of the abutment portion between the two workpieces (60) and (70). In the friction agitation jointing operation, by selecting the rotational speed of the rotor (1) and an interval distance between the position of the abutment portion (80) between the workpieces (60) and (70) and the rotational center of the rotor (1), temperature Tj at the abutment portion (80) between the two workpieces (60) and (70) is preferably set to about 400° C. which is the recrystallization temperature of the aluminum workpiece (70) constituting the low melting point workpiece. Further, the peak temperature Tp is preferably set to be equal to or higher than the recrystallization temperature and less than the melting temperature of the copper workpiece (60) constituting the high melting point workpiece, more preferably, substantially the recrystallization temperature of the copper workpiece (60) constituting the high melting point workpiece. By carrying out the friction agitation jointing in this way, in the jointing operation, materials of the workpieces (60) and (70) are not melted at the abutment portion (80), further, a softening region is formed over a wide range in the copper workpiece (60) having high melting point to thereby excellently agitate the materials of the two workpieces (60) and (70) and there is provided a firm solid phase bond portion which is excellent in quality with no adverse metallurgical effect. Particularly, by operating the rotor (1) to deviate to the side of the high melting point workpiece (60) relative to the position of the abutment portion (80) between the two workpieces (60) and (70), a larger portion of the material on the side of the high melting point workpiece (60) is excellently agitated and a firm joint portion is provided. Further, the temperature of the operation is less than the melting temperature and accordingly, the high melting point copper workpiece (60) does not undergo adverse thermal effect as in the case of molten welding.

Figure 7A:
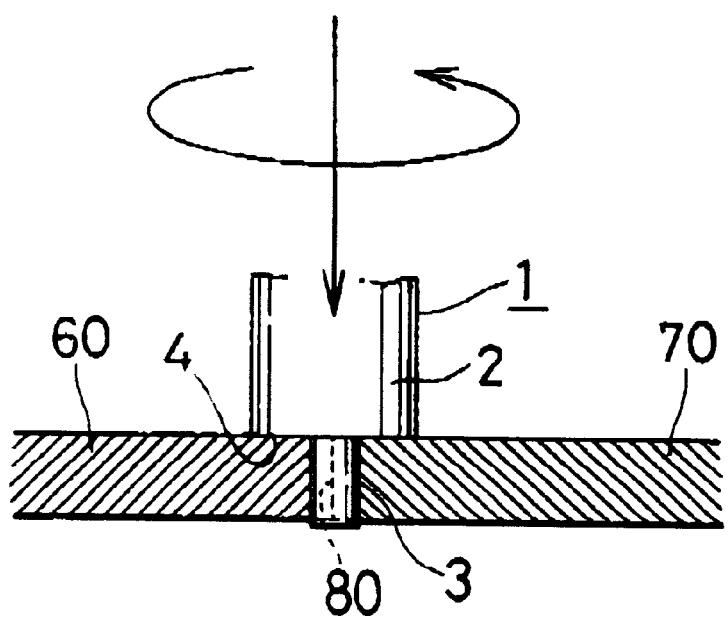
Figure 7B:
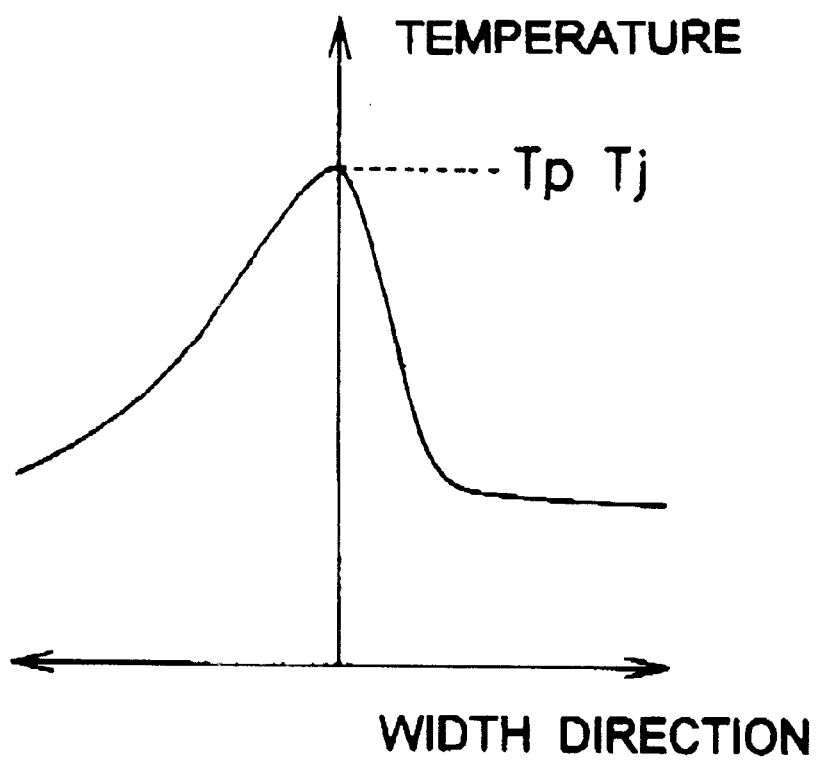
Figure 8A:
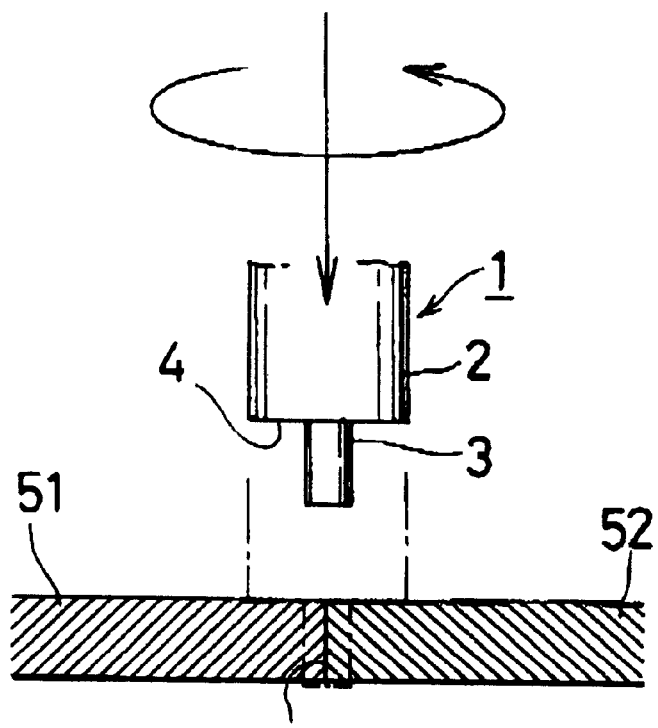
FIG. 8A is a sectional view showing a friction agitation jointing method and FIG. 8B is a plane view showing the friction agitation jointing method.
Figure 8B:
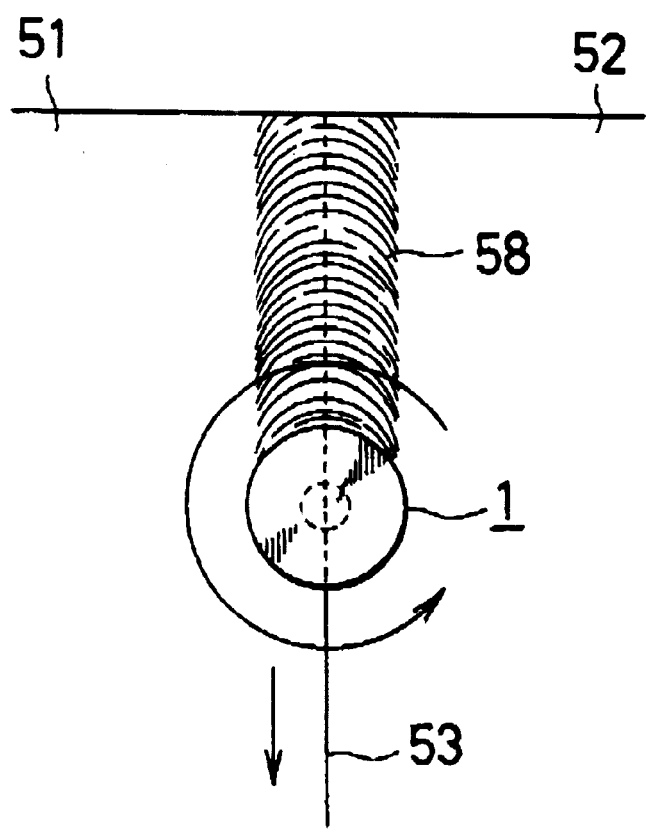

Incidentally, as shown by FIG. 7A, when the copper workpiece (60) and the aluminum workpiece (70) are brought into an abutted state and jointing operation is carried out by operating the rotor (1) to coincide with the position of the abutment portion (80) between the two workpieces (60) and (70), melting is caused in the low melting temperature aluminum workpiece (70) at the abutment portion (80) and jointing by friction agitation jointing, that is, jointing in a solid phase state is not established. A temperature profile in this case is shown by FIG. 7B.

FIG. 4 shows a fourth embodiment of the invention. According to the fourth embodiment, a workpiece made of iron and a workpiece made of aluminum are brought into an abutted state and are subjected to friction agitation jointing. The melting point of the iron workpiece is higher than that of the aluminum workpiece. Further, the thermal conductivity of the iron workpiece is lower than that of the aluminum workpiece different from the case of the first embodiment.

Figure 4A:
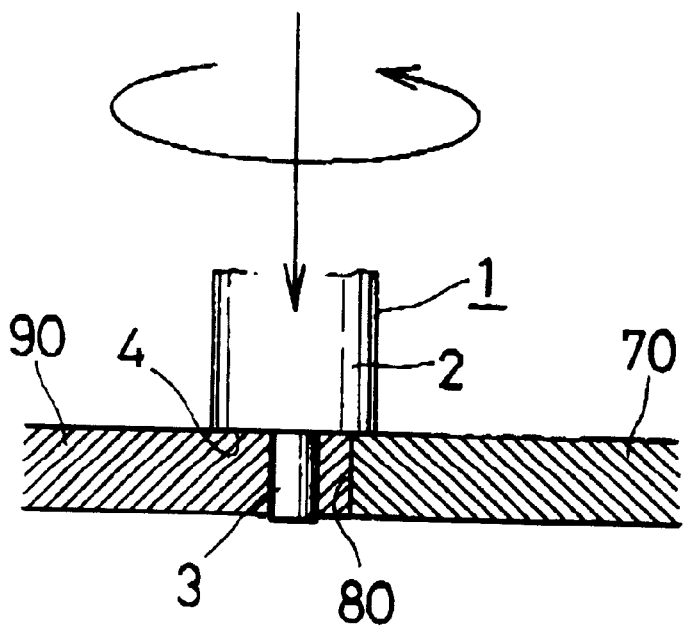
Figure 4B:
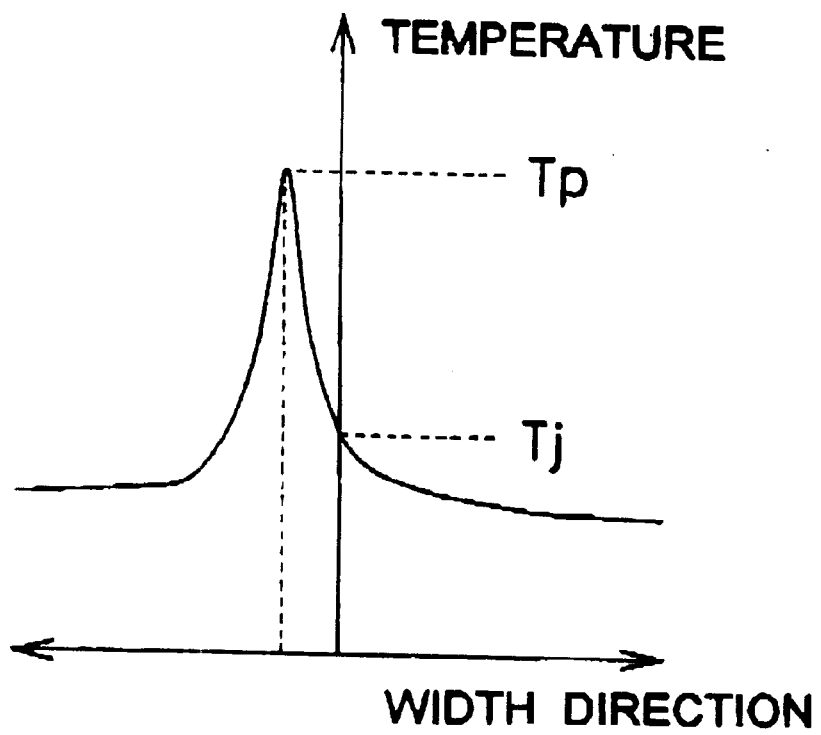

In this case, as shown by FIG. 4A, jointing is not established excellently only by exerting the rotor (1) to deviate to the side of the iron workpiece (90) constituting the high melting point workpiece relative to the position of the abutment portion (80) between the two workpieces (70) and (90). That is, according to a temperature profile in this case, as shown by FIG. 4B, heat is difficult to conduct to the abutment portion (80) between the two workpieces (90) and

(70) owing to the low thermal conductivity of the iron workpiece (90) and accordingly, the abutment portion (80) is not brought into a state of softening temperature suitable for friction agitation jointing and materials of the two workpieces (70) and (90) are not agitated together.

Figure 5:
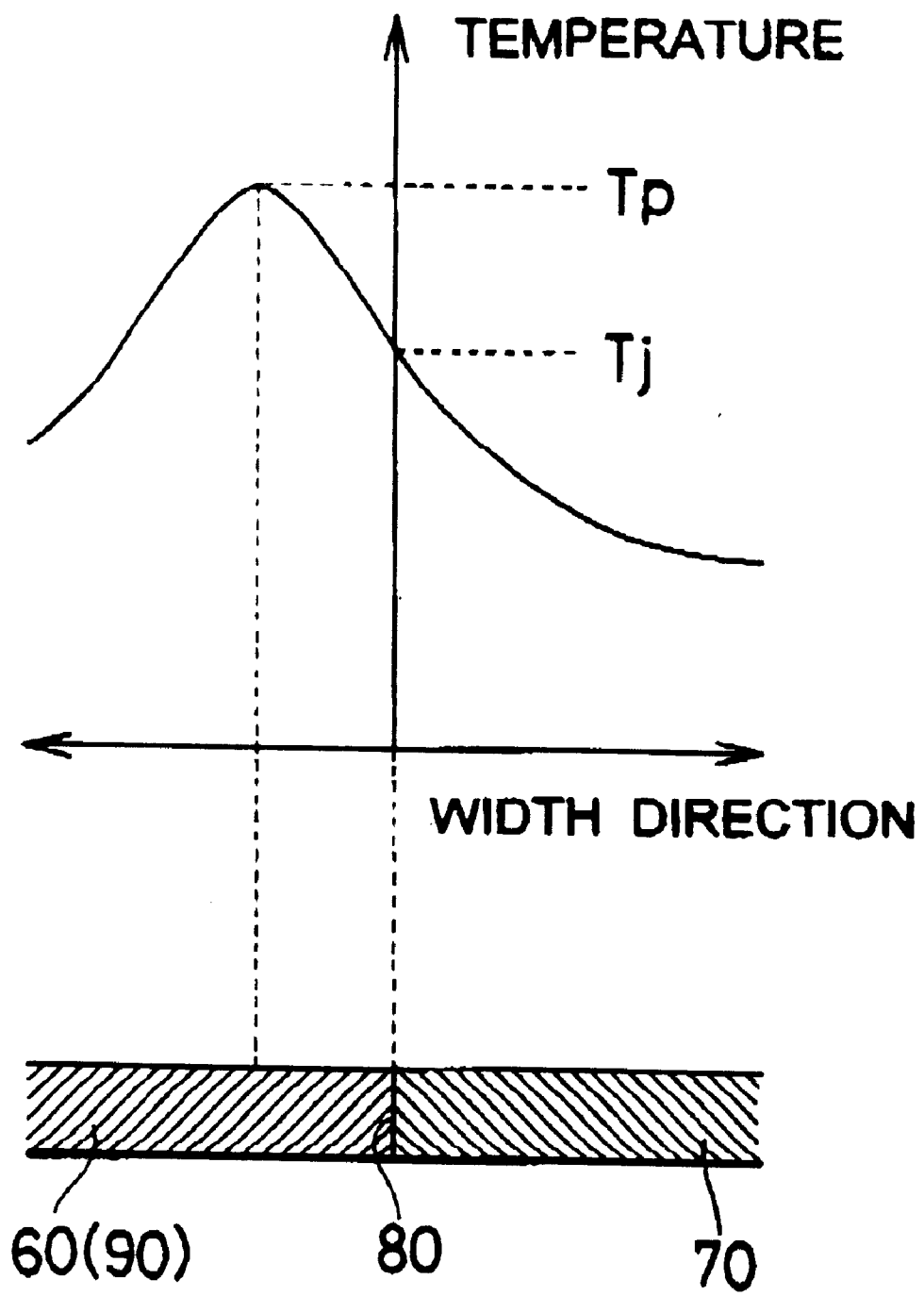
FIG. 5 is a graph showing an ideal temperature profile.

The fourth embodiment shows the friction agitation jointing method in such a case in which temperatures of the workpieces (70) and (90) are separately controlled. That is, according to an ideal temperature profile for subjecting workpieces made of metals having different melting points to friction agitation jointing, generally speaking, there is satisfied a condition in which as shown by FIG. 5, temperature peak Tp is formed to dispose on the side of the high melting point workpiece (70) relative to the position of the abutment portion (80) between the two workpieces (70) and (90), more preferably, temperature Tj at the abutment portion (80) between the two workpieces (70) and (90) is equal to or higher than the recrystallization temperature and less than the melting temperature of the low melting point workpiece (70), preferably, substantially the recrystallization temperature, more preferably, the peak temperature Tp is equal to or higher than the recrystallization temperature and less than the melting temperature of the high melting point workpiece (90), preferably, substantially the recrystallization temperature. In the jointing operating, in order to form such a temperature profile, for example, the iron workpiece (90) or the aluminum workpiece (70) is heated by heating means such as a burner or cooled by cooling means by blowing air at jointing or in jointing. Thereby, during the jointing operation, materials of the workpieces (70) and (90) are not melted at the abutment portion (80), further, a softening region is formed over a wide range in the high melting point iron workpiece (90), materials of the two workpieces (70) and (90) are excellently agitated and there is achieved a firm solid phase bond portion which is excellent in quality with no adverse metallurgical effect. In this case, the rotor (1) may be operated to deviate to the side of the high melting point workpiece (90) relative to the abutment portion (80) between the two workpieces (70) and (90) or may be operated to coincide with the position of the abutment portion (80) between the two workpieces (70) and (90). Further, heating or cooling operation in the embodiment may be applied to the case of the first embodiment mentioned above.

Figure 6B:
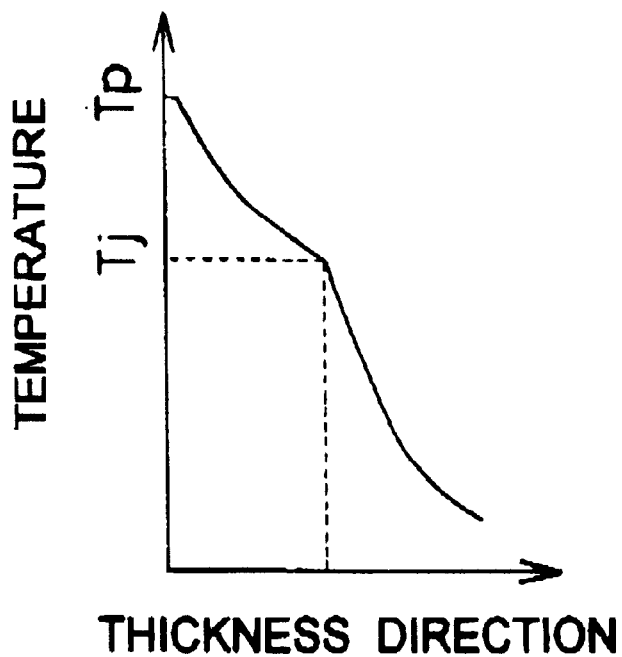
Figure 6A:
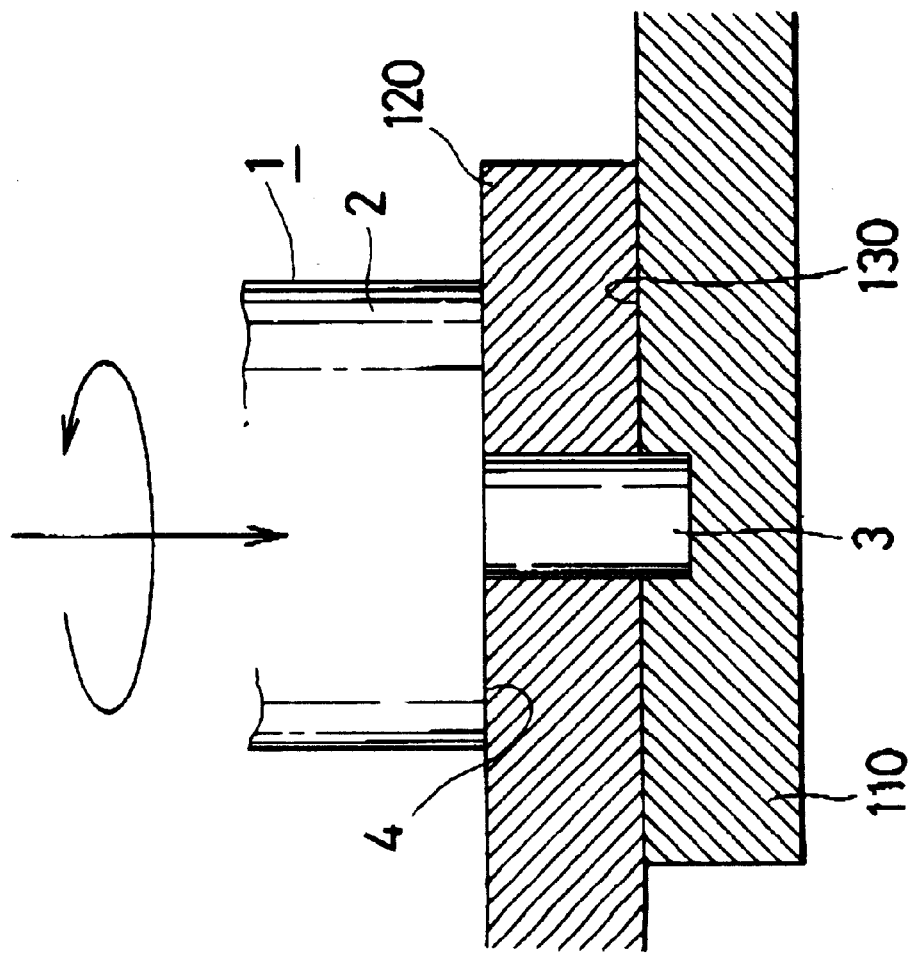

FIGS. 6A and 6B show a fifth embodiment of the invention. According to the fifth embodiment, as shown by FIG. 6A, the low melting point metal workpiece (110) and the high melting point metal workpiece (120) are brought into an overlapped state and is subjected to friction agitation jointing. In this case, as shown in the drawing, the jointing operation is carried out by operating the rotor (1) from a side of the high melting point workpiece (120) opposed to the low melting point workpiece (110) to reach the walls of the two workpieces (110) and (120). A temperature profile in jointing is shown by FIG. 6B. As shown by the drawing, the temperature peak Tp is formed on the side of the high melting point workpiece (120) having a larger area of contact with the rotor (1) In the friction jointing operation, by selecting the rotational speed of the rotor (1). or the shape of the probe (3) of the rotor (1), temperature Tj at the overlapped portion (130) between the two workpieces (110) and (120) is set to temperature equal to or higher than the recrystallization temperature and less than the melting temperature of the low melting point workpiece (110), preferably, substantially the recrystallization temperature. Further, the peak temperature Tp is set to temperature equal to or higher than the recrystallization temperature and less than the melting temperature of the high melting point workpiece (120), preferably, substantially the recrystallization temperature. By carrying out the friction agitation jointing in this way, in the jointing operation, materials of the two workpieces (110) and (120) are not melted at the overlapped portion (130), further, a softening region is formed over a wide range at the high melting point workpiece (120), the materials of the two workpieces (110) and (120) are excellently agitated and there is achieved a firm solid phase bond portion which is excellent in quality with no adverse metallurgical effect.

Although as mentioned above, the embodiments of the present invention have been shown, the invention is not limited thereto but various modifications are feasible. For example, the jointing method for the invention is not limited to that of an abutment joint or an overlap joint but is widely used in various joint style such as a T joint. Further, the invention is not limited to jointing of a pure Al series workpiece and an Al—Mg series workpiece, a copper one and an aluminum one and an iron one and an aluminum one but can widely be used in jointing various workpieces having different deformation resistance or melting points. so far as deformation resistance or melting points differ, two workpieces may be of the same kind or of different kinds.

Further, in jointing workpieces having different melting points, in the case in which jointing operation is carried out by separately using heating means and cooling means, as heating means or cooling means, various means may be used other than means explained above. Further, also in respect of a method of forming temperature peak in the embodiments, various methods may be adopted other than described above.

EXAMPLES

Example 1

A pure Al series workpiece of JIS 1100 having the length of 200 mm, the width of 100 mm and the thickness of 4 mm and an Al—Mg series workpiece of JIS 5083 having the same dimensions are abutted together at end faces thereof in the width direction.

Meanwhile, a jointing tool having a rotor with the shoulder diameter of 12 mm, the probe diameter of 4 mm, and the probe length of 4 mm is prepared.

Further, while rotating the rotor and the probe of the jointing tool at 1000 rpm, the probe is embedded at a position displaced from an abutment portion between the two workpieces to the side of the Al—Mg series workpiece by 4 mm and the jointing tool is moved along the abutment portion to thereby carry out friction agitation jointing. Materials of the rotor and the probe are SKD 61.

When after the operation, rupture strength of the joint portion between the workpieces is investigated, it is found to be 90 N/mm$_2$.

In contrast thereto, friction agitation jointing is carried out under the same conditions mentioned above except that the probe is inserted to the abutment portion between the two workpieces and when the rupture strength of the joint portion between the workpieces is investigated, it is found to be 50 N/mm$_2$.

Example 2

Two workpieces the same as described are arranged in an overlapped state. Further, a jointing tool the same as that in Example 1 except that the length of the probe is set to 7 mm is used and while rotating the probe at a rotational number the same as that in Example 1, the probe is embedded from the side of the Al—Mg series workpiece in overlapping direction. Further, under the state, the tool is moved along the length direction of the workpiece and friction agitation jointing is carried out.

After the jointing operation, when the rupture strength of the joint portion between the workpieces is investigated, it is found to be 60 N/mm$_2$.

In contrast thereto, friction agitation jointing is carried out under conditions the same as above-described except that the probe is embedded from the side of the pure Al series workpiece and when rupture strength of the joint portion between the workpieces is investigated, it is found to be 40 N/mm$_2$.

Terminology and description used here are used for explaining one of the embodiments according to the invention and the invention is not limited thereto. The invention permits any design change so far as it is in the scope of claims unless it is not deviated from the spirit of the invention.

What is claimed is:

1. A friction agitation jointing method of workpieces made of metals, wherein the workpieces made of the metals having deformation resistance different from each other are arranged in an abutted state, a rotating probe is arranged in a state in which the rotating probe is displaced to and embedded in a side of one of the workpieces having a larger one of the deformation resistance relative to an abutted portion and the workpieces are subjected to friction agitation jointing while moving at least the probe or the workpieces under the state.

2. The friction agitation jointing method of workpieces made of metals according to claim 1, wherein both of two of the workpieces to be jointed are made of an aluminum series material.

3. The friction agitation jointing method of workpieces made of metals according to claim 1, wherein the probe is installed at a rotor having a diameter lager than a diameter of the probe, the rotor is provided with a flat shoulder portion and the jointing is carried out by pressing the shoulder portion to the workpieces.

4. A friction agitation jointing method of workpieces made of metals, wherein the workpieces made of the metals having melting points different from each other are brought into an abutted state, a rotating probe is arranged in a state in which the rotating probe is displaced to and embedded in a side of one of the workpieces having a higher one of the melting points relative to an abutted portion and the workpieces are subjected to friction agitation jointing while moving at least the probe or the workpieces under the state.

5. The friction agitation jointing method of workpieces made of metals according to claim 4, wherein the two workpieces to be jointed are made of a copper series material and an aluminum series material.

6. The friction agitation jointing method of workpieces made of metals according to claim 4, wherein the two workpieces to be jointed are made of an iron series material and an aluminum series material.

7. The friction agitation jointing method of workpieces made of metals according to claim 4, wherein both of the workpieces to be jointed are made of an aluminum series material.

8. The friction agitation jointing method of workpieces made of metals according to claim 4, wherein the probe is installed at a rotor having a diameter lager than a diameter of the probe, the rotor is provided with a flat shoulder portion and the jointing is carried out by pressing the shoulder portion to the workpieces.

* * * * *